United States Patent
Sugita

(10) Patent No.: US 11,780,135 B2
(45) Date of Patent: Oct. 10, 2023

(54) INJECTION MOLDING APPARATUS AND MOLD OF INJECTION MOLDING APPARATUS

(71) Applicant: SEIKO EPSON CORPORATION, Tokyo (JP)

(72) Inventor: Atsuhiko Sugita, Suwa (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/848,482

(22) Filed: Jun. 24, 2022

(65) Prior Publication Data
US 2022/0410455 A1 Dec. 29, 2022

(30) Foreign Application Priority Data

Jun. 25, 2021 (JP) .................................. 2021-105352

(51) Int. Cl.
*B29C 45/38* (2006.01)
*B29C 45/26* (2006.01)
*B29C 45/40* (2006.01)

(52) U.S. Cl.
CPC .............. *B29C 45/38* (2013.01); *B29C 45/26* (2013.01); *B29C 45/401* (2013.01); *B29C 2045/384* (2013.01)

(58) Field of Classification Search
CPC . B29C 2045/384; B29C 45/38; B29C 69/001; B29C 45/401
See application file for complete search history.

(56) References Cited

U.S. PATENT DOCUMENTS

2022/0063162 A1* 3/2022 Ho .......................... B29C 45/38

FOREIGN PATENT DOCUMENTS

JP          2003-039491 A      2/2003
TW          M549694 U     * 10/2017

OTHER PUBLICATIONS

Translation of TW-M549694-U (Year: 2017).*

* cited by examiner

*Primary Examiner* — Xiao S Zhao
*Assistant Examiner* — John J DeRusso
(74) *Attorney, Agent, or Firm* — Harness, Dickey & Pierce, P.L.C.

(57) ABSTRACT

An injection molding apparatus includes: a mold including a fixed mold and a movable mold facing the fixed mold, and that has a cavity defined by the fixed and movable molds and a runner communicating with the cavity; a mold clamping unit moves the movable mold with respect to the fixed mold; an injection unit injects a molding material into the cavity through the runner; a cutting mechanism at the mold includes a cutter projecting to the runner; a drive unit provided on the mold that drives the cutting mechanism; and a control unit controlling the injection unit, the mold clamping unit, and the drive unit. The control unit controls the injection unit to inject the molding material into the cavity, and then controls the drive unit to cause the cutter to project to the runner, thereby cutting the molding material hardened in the runner.

9 Claims, 12 Drawing Sheets

INJECTION MOLDING APPARATUS AND MOLD OF INJECTION MOLDING APPARATUS

The present application is based on, and claims priority from JP Application Serial Number 2021-105352, filed Jun. 25, 2021, the disclosure of which is hereby incorporated by reference herein in its entirety.

BACKGROUND

1. Technical Field

The present disclosure relates to an injection molding apparatus and a mold of the injection molding apparatus.

2. Related Art

JP-A-2003-039491 discloses a tunnel gate type mold that has a tunnel gate for communicating a runner and a cavity. In this mold, a movement of a movable mold with respect to a fixed mold at the time of mold opening causes a molding material hardened in the tunnel gate to be cut, so that the molding material hardened in the cavity is separated from the molding material hardened in a sprue and the runner.

As in JP-A-2003-039491, in the tunnel gate type mold, the movement of the movable mold can cause the molding material hardened in the cavity and the molding material hardened in the runner to be cut away automatically. However, the molding material may be torn off by the movement of the movable mold, and the molding material may not be cut away at a desired position.

SUMMARY

According to a first aspect of the present disclosure, an injection molding apparatus is provided. The injection molding apparatus includes: a mold that includes a fixed mold and a movable mold facing the fixed mold, and that is formed with a cavity partitioned by the fixed mold and the movable mold and a runner communicating with the cavity; a mold clamping unit configured to move the movable mold with respect to the fixed mold; an injection unit configured to inject a molding material into the cavity through the runner; a cutting mechanism that is provided at the mold and that includes a cutter projecting to the runner; a drive unit that is provided on the mold and that is configured to drive the cutting mechanism; and a control unit configured to control the injection unit, the mold clamping unit, and the drive unit. The control unit controls the injection unit to inject the molding material into the cavity, and then controls the drive unit to cause the cutter to project to the runner, thereby cutting the molding material hardened in the runner.

According to a second aspect of the present disclosure, a mold of an injection molding apparatus is provided. The mold of an injection molding apparatus includes: a fixed mold; a movable mold that faces the fixed mold and that moves with respect to the fixed mold; a cutting mechanism that includes a cutter; and a drive unit configured to drive the cutting mechanism. The fixed mold and the movable mold partition a cavity to be filled with a molding material, at least one of the fixed mold and the movable mold is formed with a runner communicating with the cavity, and the cutting mechanism is driven by the drive unit to cause the cutter to project to the runner after the molding material is injected into the cavity through the runner, thereby cutting the molding material hardened in the runner.

DESCRIPTION OF EXEMPLARY EMBODIMENTS

A. First Embodiment

Figure 1:
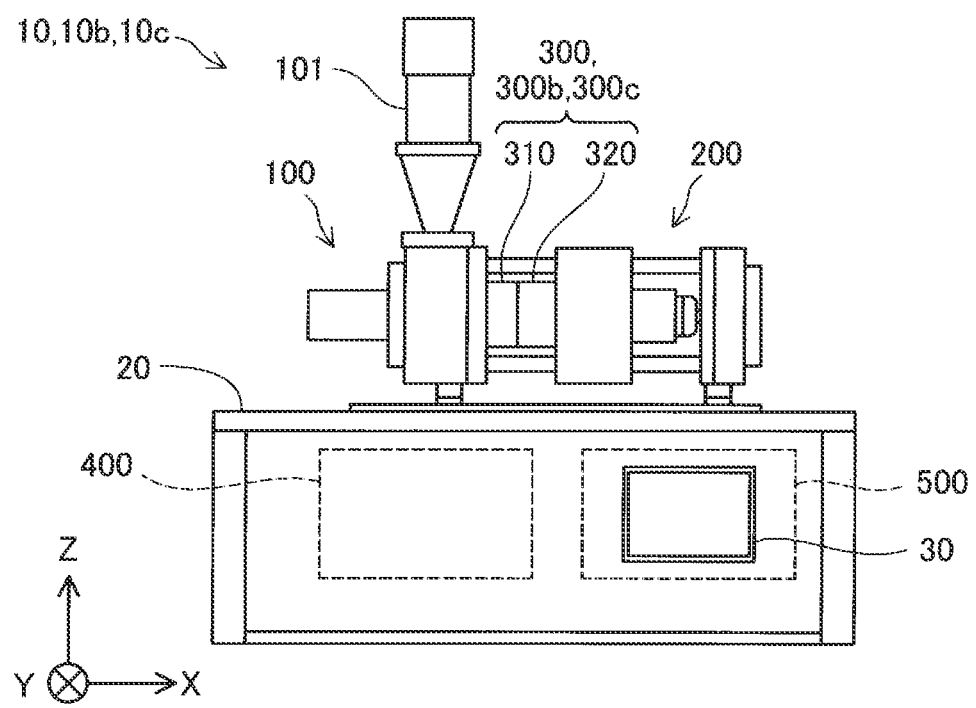
FIG. 1 is a front view illustrating a schematic configuration of an injection molding apparatus according to a first embodiment.

FIG. 1 is a front view illustrating a schematic configuration of an injection molding apparatus 10 according to a first embodiment. FIG. 1 shows arrows indicating X, Y, and Z directions that are orthogonal to one another. The X direction and the Y direction are directions parallel to a horizontal plane, and the Z direction is an opposite direction from the gravity direction. X, Y, Z directions illustrated in FIG. 2 and subsequent drawings correspond to the X, Y, and Z directions illustrated in FIG. 1. In the following description, when a direction is identified, "+" indicates a positive direction that is a direction indicated by an arrow, "−" indicates a negative direction that is an opposite direction from the direction indicated by the arrow, and positive and negative symbols are used together to indicate the directions.

The injection molding apparatus 10 includes an injection unit 100, a mold clamping unit 200, a mold 300, a refrigerant supply unit 400, and a control unit 500. In the present embodiment, the injection unit 100, the mold clamping unit 200, the refrigerant supply unit 400, and the control unit 500 are fixed to a base 20. An operation panel 30 is provided at a front surface of the base 20.

A hopper 101 into which a molding material is fed is coupled to the injection unit 100. The molding material is a material of a molded article. For example, a molding material in a pellet form or a powder form is fed to the hopper 101. As the molding material, for example, a thermoplastic resin or a thermoplastic elastomer is used.

The mold 300 includes a fixed mold 310 and a movable mold 320 facing the fixed mold 310. The fixed mold 310 and the movable mold 320 are fixed to the mold clamping unit 200. The mold 300 includes a cavity partitioned by the fixed mold 310 and the movable mold 320 and a runner communicating with the cavity. The mold clamping unit 200 moves the movable mold 320 with respect to the fixed mold 310 so as to open and close the mold 300.

The injection unit 100 plasticizes the molding material supplied from the hopper 101, and injects the plasticized molding material into the cavity through the runner. A term "plasticization" is a concept including melting, and is a change from a solid to a state having fluidity. Specifically, for a material that undergoes a glass transition, the plasticization is to raise a temperature of the material to be equal to or higher than a glass transition point. In a case of a material in which the glass transition does not occur, the plasticization refers to setting the temperature of the material to be equal to or higher than a melting point. The molding material is injected into the cavity, and the molding material cools and hardens in the cavity to produce a molded article.

The refrigerant supply unit 400 is coupled to the mold 300 via a pipe (not shown), and supplies a refrigerant to the mold 300 via the pipe. In the present embodiment, the refrigerant supply unit 400 is implemented by a chiller. Water is used as the refrigerant.

The control unit 500 controls the injection unit 100, the mold clamping unit 200, the refrigerant supply unit 400, and a drive unit 340 that drives a cutting mechanism 330 to be described later. The control unit 500 is implemented by a computer including one or a plurality of processors, a main storage device, and an input and output interface that allows a signal to be received from the outside and that allows a signal to be output to the outside. The control unit 500 produces a molded article by the processor reading a program on the main storage device and executing an injection molding process to be described later.

Figure 2:
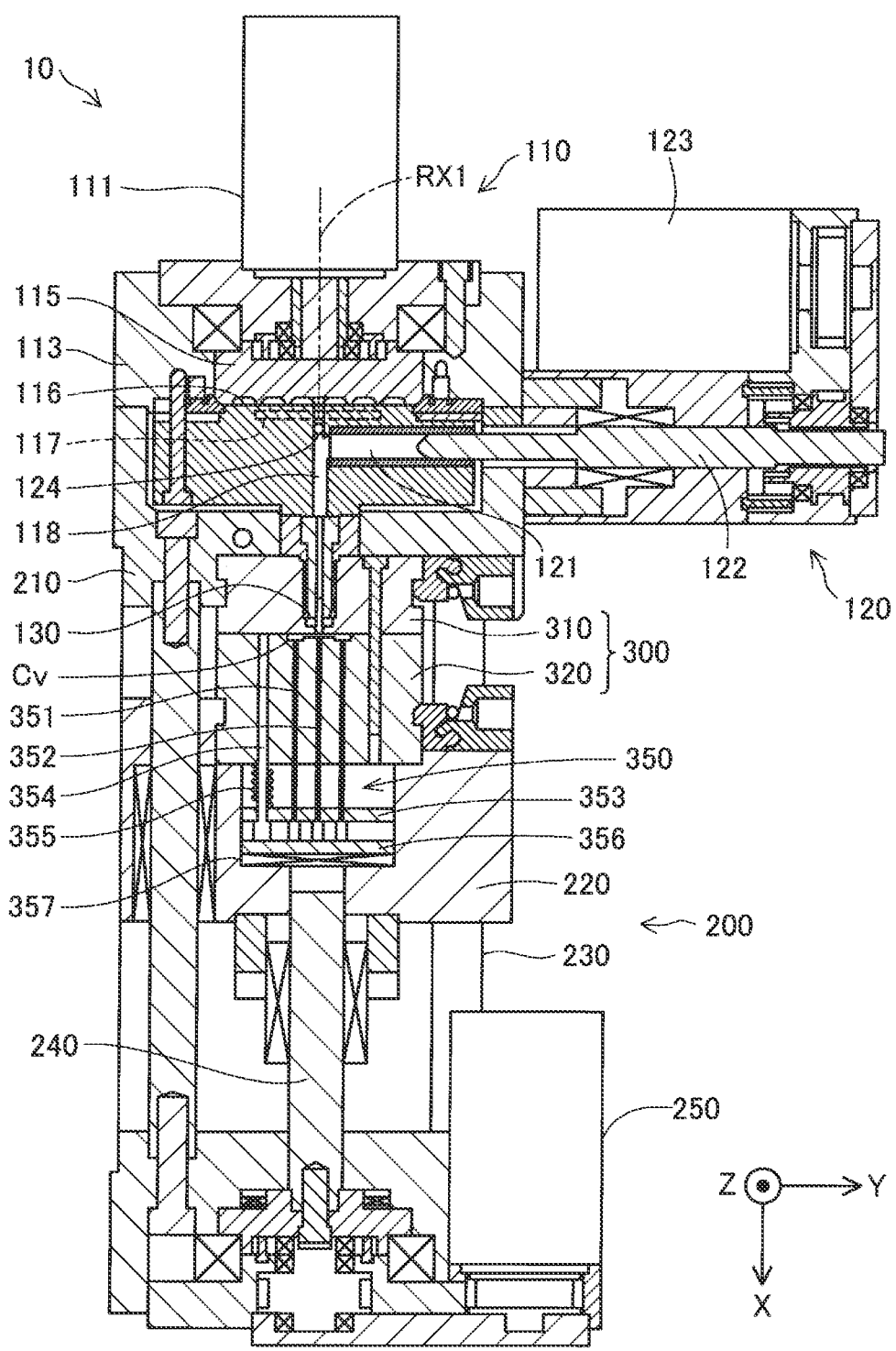
FIG. 2 is a cross-sectional view illustrating the schematic configuration of the injection molding apparatus according to the first embodiment.

FIG. 2 is a cross-sectional view illustrating the schematic configuration of the injection molding apparatus 10. FIG. 2 shows cross sections of the injection unit 100, the mold clamping unit 200, and the mold 300. The injection unit 100 includes a plasticizing unit 110, an injection control mechanism 120, and a nozzle 130.

The plasticizing unit 110 has a function of plasticizing at least a part of the molding material supplied from the hopper 101, causing the molding material to be in a paste form having fluidity, and supplying the molding material to the injection control mechanism 120.

In the present embodiment, the plasticizing unit 110 includes a screw drive unit 111, a screw case 113, a flat screw 115, a barrel 116, and a plasticizing heater 117.

The screw drive unit 111 includes a motor and a speed reducer. The screw drive unit 111 is driven under the control of the control unit 500. The screw drive unit 111 is coupled to the flat screw 115.

The flat screw 115 is accommodated in a space surrounded by the screw case 113 and the barrel 116. The flat screw 115 accommodated in the space is rotated by a rotational driving force from the screw drive unit 111.

A communication hole 118 penetrating the barrel 116 is formed in a central portion of the barrel 116. An injection cylinder 121 to be described later is coupled to the communication hole 118. The communication hole 118 is provided with a check valve 124 upstream of the injection cylinder 121.

The plasticizing heater 117 is embedded in the barrel 116. The plasticizing heater 117 is supplied with electric power to generate heat, and heats the molding material. A temperature of the plasticizing heater 117 is controlled by the control unit 500.

Figure 3:
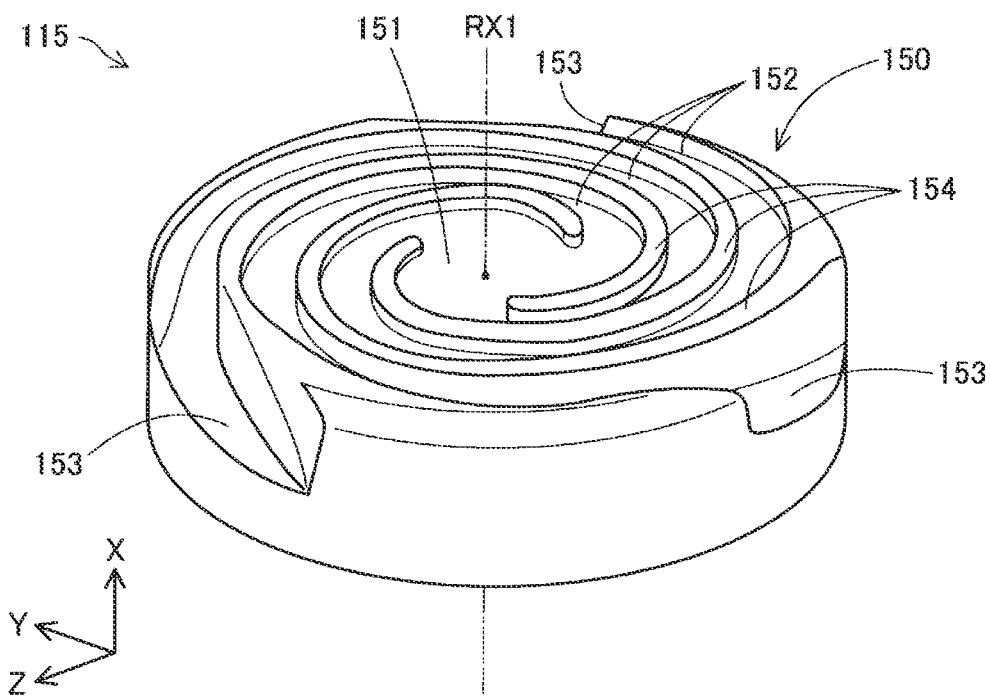
FIG. 3 is a perspective view illustrating a schematic configuration of a flat screw.

FIG. 3 is a perspective view illustrating a schematic configuration of the flat screw 115. The flat screw 115 has a substantially cylindrical shape. A height of the flat screw 115 in a direction along a central axis RX1 is smaller than a diameter of the flat screw 115. The flat screw 115 has a groove forming surface 150 facing the barrel 116. The groove forming surface 150 is formed with a groove 152 extending spirally around the central portion 151. The groove 152 communicates with a material inlet 153 formed in a side surface of the flat screw 115. The molding material supplied from the hopper 101 is introduced into the groove 152 from the material inlet 153. In the present embodiment, three grooves 152 are formed on the groove forming surface 150. The grooves 152 are separated from one another by ridge portions 154. The number of the grooves 152 is not limited to three, and may be one, two, or four or more. A shape of the groove 152 is not limited to a spiral shape, and may be a helical shape or an involute curve shape, or may be a shape drawing an arc from the central portion 151 toward an outer periphery.

Figure 4:
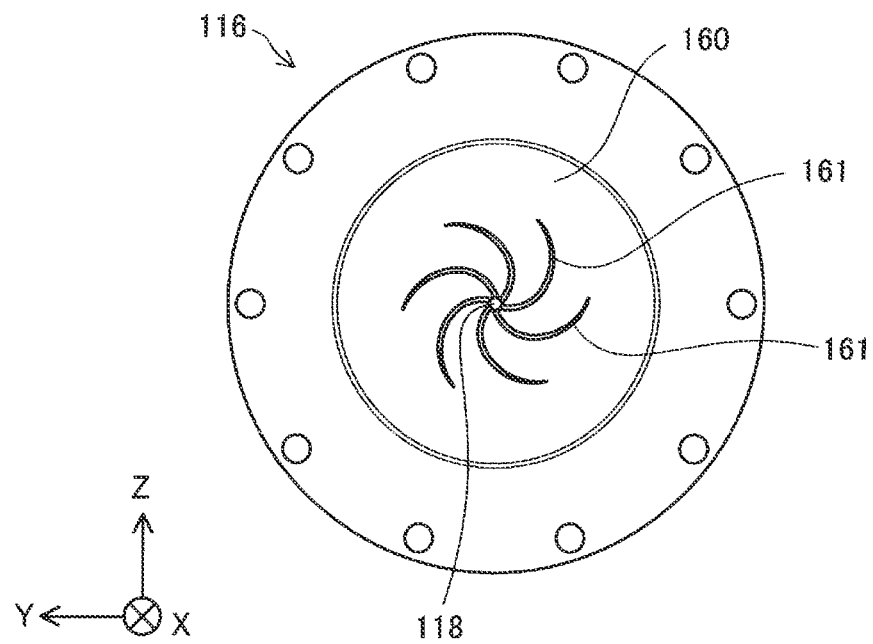
FIG. 4 is a plan view showing a schematic configuration of a barrel.

FIG. 4 is a plan view illustrating a schematic configuration of the barrel 116. The barrel 116 has a facing surface 160 facing the groove forming surface 150 of the flat screw 115. An opening portion of the communication hole 118 is formed at a center of the facing surface 160. The opening portion of the communication hole 118 is formed on an extension line of the central axis RX1 of the flat screw 115. A plurality of guide grooves 161 that are coupled to the communication hole 118 and that spirally extend from the communication hole 118 toward the outer periphery are formed at the facing surface 160. The guide groove 161 formed at the facing surface 160 may not be coupled to the communication hole 118. The guide groove 161 may not be formed at the facing surface 160.

The molding material supplied to the groove 152 of the flat screw 115 flows along the groove 152 and the guide groove 161 by the rotation of the flat screw 115 and is guided to the central portion 151 of the flat screw 115 while being plasticized between the flat screw 115 and the barrel 116 by the rotation of the flat screw 115 and the heating from the plasticizing heater 117. The molding material that flows into the central portion 151 is guided from the communication hole 118 to the injection control mechanism 120.

As illustrated in FIG. 2, the injection control mechanism 120 includes the injection cylinder 121, a plunger 122, and a plunger drive unit 123. The injection control mechanism 120 has a function of injecting, from the nozzle 130, the molding material supplied from the plasticizing unit 110 into the injection cylinder 121. The nozzle 130 is inserted into a through hole formed in the fixed mold 310. A cavity Cv partitioned between the fixed mold 310 and the movable mold 320 is filled with the molding material injected from the nozzle 130.

The injection cylinder 121 is a substantially cylindrical member coupled to the communication hole 118 of the barrel 116, and includes the plunger 122 in the injection cylinder 121. The plunger 122 slides in the injection cylinder 121 by the plunger drive unit 123 implemented by a motor, and pressure-feeds the molding material in the injection cylinder 121 to the nozzle 130. The plunger drive unit 123 is driven under the control of the control unit 500.

The mold clamping unit 200 has a function of moving the movable mold 320 with respect to the fixed mold 310, that is, a function of opening and closing the mold 300. In the present embodiment, the mold clamping unit 200 includes a fixed platen 210, a movable platen 220, a tie bar 230, a ball screw portion 240, and a mold drive unit 250.

The injection unit 100, the fixed platen 210, and the movable platen 220 are arranged in this order along the X direction. The fixed platen 210 is fixed to a tip portion of the tie bar 230 provided along the X direction. The fixed mold 310 is fixed to a surface of the fixed platen 210 on a movable platen 220 side by, for example, bolts or clamps.

The movable platen 220 is movable along the tie bar 230. The movable platen 220 is coupled to the ball screw portion 240 provided along the X direction. The movable mold 320 is fixed to a surface of the movable platen 220 on a fixed platen 210 side by, for example, bolts or clamps.

The mold drive unit 250 includes a motor and a speed reducer. The mold drive unit 250 is driven under the control of the control unit 500. The mold drive unit 250 is coupled to the movable platen 220 via the ball screw portion 240. The mold drive unit 250 opens and closes the mold 300 by rotating the ball screw portion 240 and moving the movable mold 320 fixed to the movable platen 220 with respect to the fixed mold 310 fixed to the fixed platen 210.

The mold 300 is provided with an extruding mechanism 350 that demolds the molding material hardened in the mold 300 from the movable mold 320. The extruding mechanism 350 includes a first ejector pin 351, a second ejector pin 352, a support plate 353, a support rod 354, a spring 355, an extrusion plate 356, and a thrust bearing 357.

The first ejector pin 351 is a rod-shaped member that extrudes and demolds the molding material hardened in the cavity Cv, that is, the molded article. The first ejector pin 351 passes through the movable mold 320 and is inserted into the cavity Cv. The second ejector pin 352 is a rod-shaped member that extrudes and demolds the molding material hardened in a runner Rn. The second ejector pin 352 passes through the movable mold 320 and is inserted into the runner Rn.

The support plate 353 is a plate member that supports the first ejector pin 351 and the second ejector pin 352. The first ejector pin 351 and the second ejector pin 352 are fixed to the support plate 353. The support rod 354 is fixed to the support plate 353, and is inserted into a through hole formed in the movable mold 320. The spring 355 is arranged in a space between the movable mold 320 and the support plate 353, and is inserted into the support rod 354. The spring 355 urges the support plate 353 such that a tip portion of the first ejector pin 351 forms a part of a wall surface of the cavity Cv and a tip portion of the second ejector pin 352 forms a part of a wall surface of the runner Rn at a time of molding. The extrusion plate 356 is fixed to the support plate 353. The thrust bearing 357 is attached to the extrusion plate 356, and is provided such that a tip portion of the ball screw portion 240 does not damage the extrusion plate 356.

Figure 5:
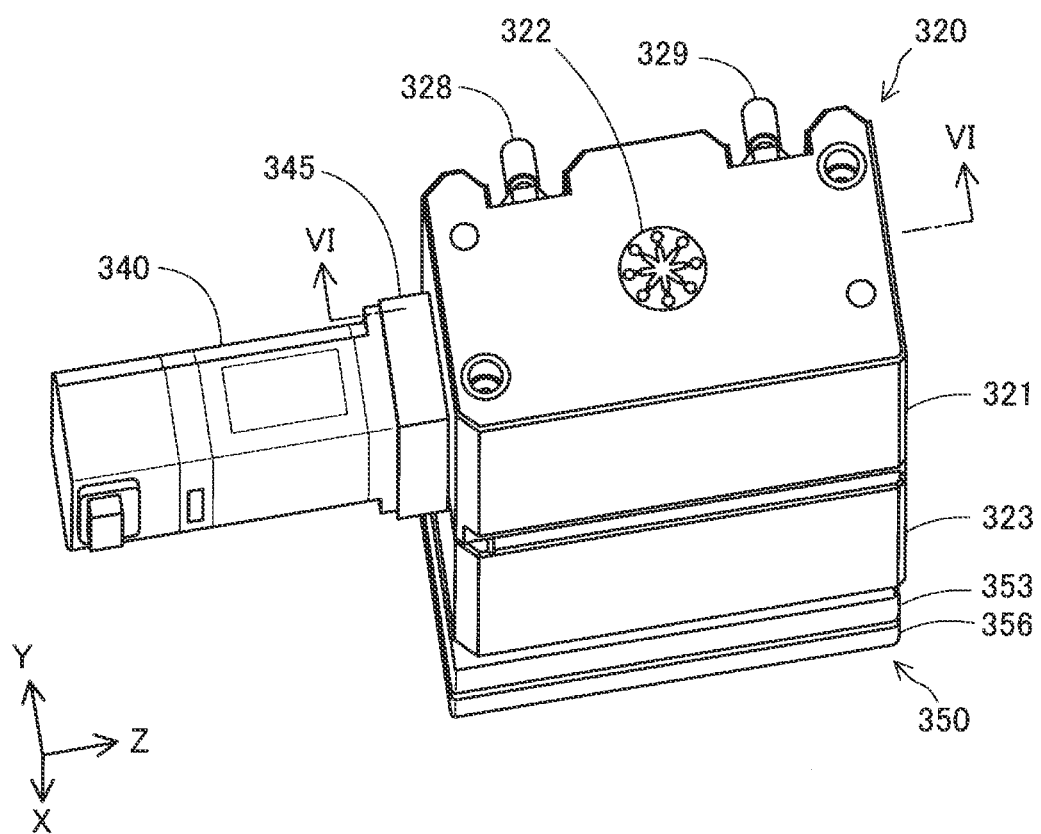
FIG. 5 is a perspective view illustrating a schematic configuration of a movable mold according to the first embodiment.
Figure 6:
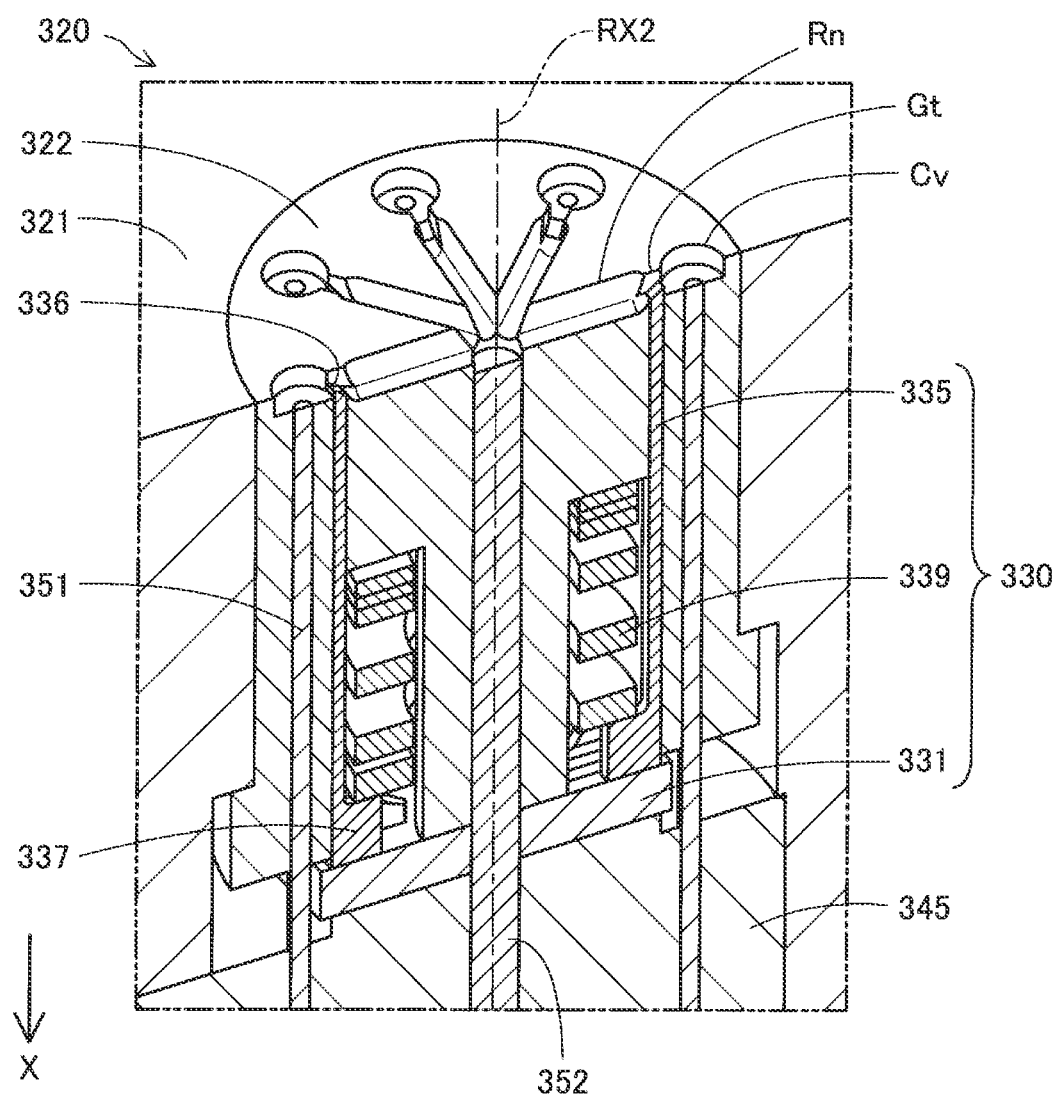
FIG. 6 is a first perspective view illustrating a configuration of a cutting mechanism according to the first embodiment.
Figure 7:
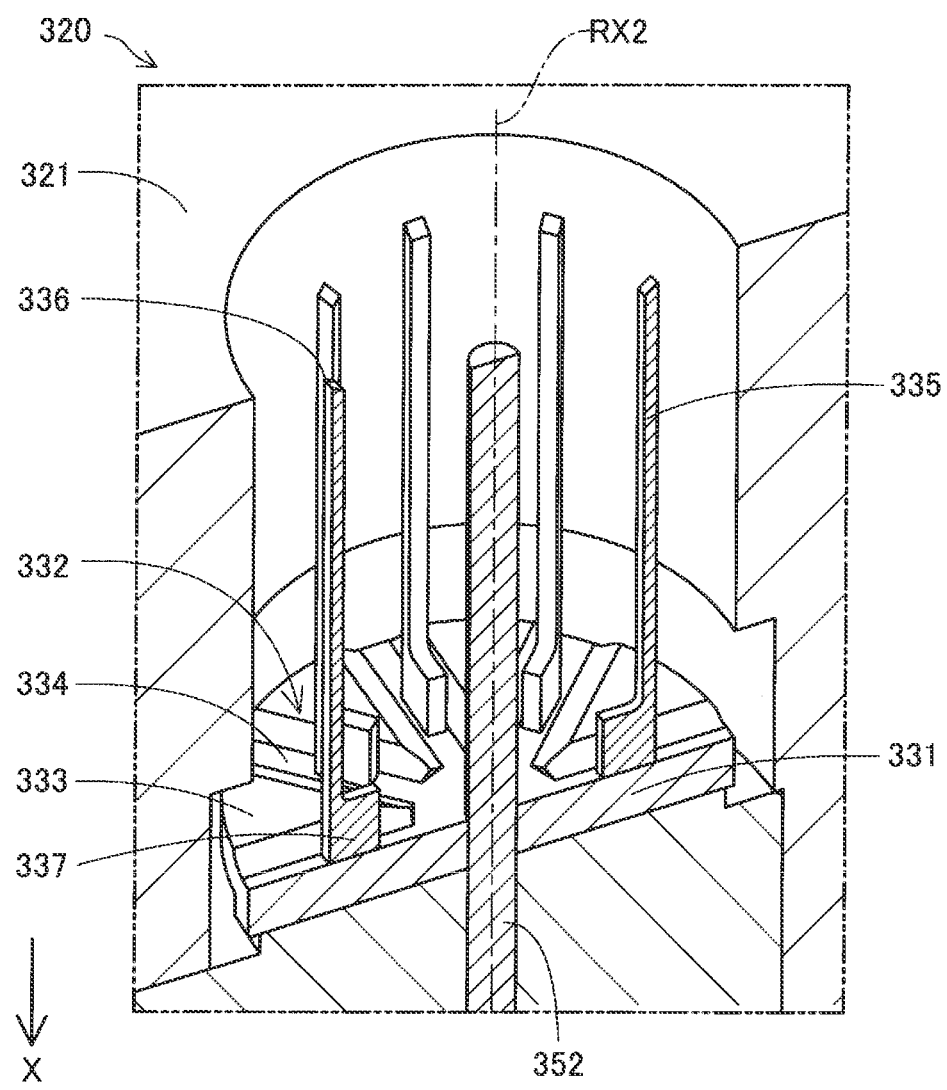
FIG. 7 is a second perspective view illustrating the configuration of the cutting mechanism according to the first embodiment.

FIG. 5 is a perspective view illustrating a schematic configuration of the movable mold 320 according to the present embodiment. FIG. 6 is a first perspective view illustrating a configuration of the cutting mechanism 330 according to the present embodiment. FIG. 7 is a second perspective view illustrating the configuration of the cutting mechanism 330 according to the present embodiment. FIG. 6 and FIG. 7 illustrate the movable mold 320 cut along a VI-VI line in FIG. 5 and the cutting mechanism 330 so as to facilitate understanding of the technique. FIG. 7 illustrates the movable mold 320 in a state in which a telescoping portion 322 is removed and the cutting mechanism 330 in a state in which a first elastic member 339 is removed so as to facilitate understanding of the technique.

As illustrated in FIG. 5, in addition to the fixed mold 310, the movable mold 320, and the extruding mechanism 350 described above, the mold 300 according to the present embodiment includes the cutting mechanism 330, the drive unit 340, and a rotational axis conversion unit 345.

The movable mold 320 includes an accommodation portion 321, the telescoping portion 322, and a receiving plate 323. The accommodation portion 321 is formed with a concave portion for accommodating the telescoping portion 322. The telescoping portion 322 is fixed in the concave portion of the accommodation portion 321. The telescoping portion 322 is formed with the concave portion for partitioning the cavity Cv and a groove for partitioning the runner Rn. The receiving plate 323 supports the accommodation portion 321. The accommodation portion 321 is formed with a refrigerant inlet 328 for introducing the refrigerant supplied from the refrigerant supply unit 400, and a refrigerant outlet 329 for discharging the refrigerant introduced from the refrigerant inlet 328.

As illustrated in FIG. 6, in the present embodiment, eight cavities Cv and eight runners Rn are formed between the fixed mold 310 and the movable mold 320. The eight cavities Cv are arranged side by side along a circumferential direction. The eight runners Rn are arranged radially. In the following description, an end portion of the runner Rn coupled to the cavity Cv is referred to as a gate Gt.

As illustrated in FIG. 6, in the present embodiment, the cutting mechanism 330 is arranged in an internal space formed in the movable mold 320. In the present embodiment, the cutting mechanism 330 includes a rotary table 331, eight cutters 335, and the first elastic member 339.

The rotary table 331 is provided in a +X direction with respect to the telescoping portion 322. In the present embodiment, the rotary table 331 is formed in a shape of a disk centered on a central axis RX2. The rotary table 331 is rotatably supported around the central axis RX2 by the rotational axis conversion unit 345. In the following description, the central axis RX2 of the rotary table 331 may be referred to as a rotational axis RX2 of the rotary table 331. In other embodiments, the rotary table 331 may be formed not in the shape of a disk but in, for example, a shape of a regular octagonal plate.

As illustrated in FIG. 7, a surface of the rotary table 331 on a −X direction side is provided with an uneven surface 332 centered on the central axis RX2. The uneven surface 332 includes eight convex portions 333 arranged side by side along a circumferential direction centered on the central axis RX2. The convex portions 333 are provided in a fan shape with an arc along the circumferential direction of the rotary table 331 when viewed from above to below. A portion of the uneven surface 332 excluding the eight convex portions 333 is flat. In the following description, the portion of the uneven surface 332 excluding the eight convex portions 333 is referred to as a concave portion 334.

The eight cutters 335 are arranged side by side along the circumferential direction of the rotary table 331. The cutters 335 are arranged between the convex portions 333 of the rotary table 331. The cutters 335 are formed in a rod shape. The cutters 335 are arranged parallel to the central axis RX2 of the rotary table 331. Tip portions 336 of the cutters 335 are formed as a sharp blade. As illustrated in FIG. 6, the tip portion 336 is accommodated in a through hole formed in the telescoping portion 322. This through hole has an opening portion on an inner wall surface of the gate Gt. To prevent the inflow of the molding material, a gap between the cutter 335 and the inner wall surface of the through hole is preferably from a few micrometers to a few hundred micrometers. Rear end portions 337 of the cutters 335 bend toward the central axis RX2 of the rotary table 331. The rear end portion 337 is in contact with the concave portion 334 of the rotary table 331.

The first elastic member 339 is provided between the central axis RX2 of the rotary table 331 and each cutter 335. An end portion of the first elastic member 339 on the −X direction side is in contact with the telescoping portion 322, and an end portion of the first elastic member 339 on the +X direction side is in contact with the rear end portions 337 of the cutters 335. The first elastic member 339 expands and contracts along the X direction from the fixed mold 310 to the movable mold 320. The first elastic member 339 urges the cutters 335 toward the uneven surface 332 of the rotary table 331. In the present embodiment, the first elastic member 339 is implemented by a compression coil spring. In other embodiments, the first elastic member 339 may be implemented by a rubber or an elastomer.

As illustrated in FIG. 5, the drive unit 340 is provided in a direction perpendicular to a moving direction of the movable mold 320 with respect to the movable mold 320. In the present embodiment, the drive unit 340 is provided in a −Z direction with respect to the movable mold 320. The drive unit 340 is fixed to the movable mold 320 via the rotational axis conversion unit 345. The drive unit 340 generates a rotational driving force for rotating the rotary table 331. In the present embodiment, the drive unit 340 is implemented by a motor driven under the control of the control unit 500. As the motor constituting the drive unit 340, it is preferable to use a servo motor or a stepping motor capable of controlling a rotation position of an output shaft. In the present embodiment, the output shaft of the motor is provided parallel to the Z direction.

The rotational axis conversion unit 345 is embedded in an opening portion communicating with the internal space in which the cutting mechanism 330 is provided. The rotational axis conversion unit 345 converts the direction of the rotational driving force generated by the drive unit 340 and transmits the rotational driving force to the rotary table 331. In the present embodiment, the rotational axis conversion unit 345 is implemented by an orthogonal axis type speed reducer. An input shaft of the speed reducer is arranged parallel to the Z direction, and is coupled to the output shaft of the motor constituting the drive unit 340. As illustrated in FIG. 6, the output shaft of the speed reducer is provided parallel to the X direction, and is coupled to an opposite-side surface of the rotary table 331 from the uneven surface 332.

In the present embodiment, by the rotational driving force applied to the rotary table 331 from the drive unit 340 via the rotational axis conversion unit 345, the rotary table 331 rotates around the central axis RX2. The cutter 335 linearly moves along the central axis RX2 of the rotary table 331 according to the rotation of the rotary table 331. Specifically, when the rotary table 331 rotates by 22.5 degrees from the rotation position illustrated in FIG. 6, the convex portion 333 is in contact with the rear end portion 337 of the cutter 335. Since the cutter 335 is pushed by the convex portion 333 and moves in the −X direction, the tip portion 336 of the cutter 335 projects into the gate Gt. When the rotary table 331 further rotates by 22.5 degrees, the convex portion 333 moves between the cutters 335. Since the cutter 335 is pushed back by the first elastic member 339 and moves in the +X direction, the rear end portion 337 of the cutter 335 is in contact with the concave portion 334, and the tip portion 336 of the cutter 335 is accommodated in the through hole of the telescoping portion 322.

Figure 8:
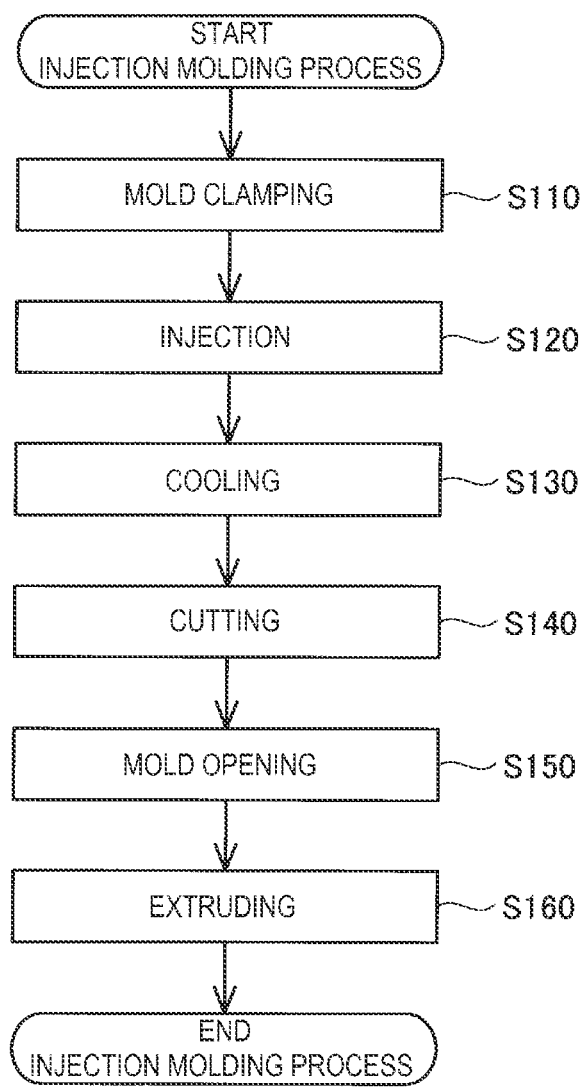
FIG. 8 is a flowchart illustrating contents of an injection molding process according to the first embodiment.

FIG. 8 is a flowchart illustrating contents of the injection molding process. FIGS. 9 to 13 are illustrative diagrams showing a manner of the injection molding according to the injection molding process. The process is started by the control unit 500 when, for example, a start button of the operation panel 30 provided at the base 20 is pressed.

Figure 9:
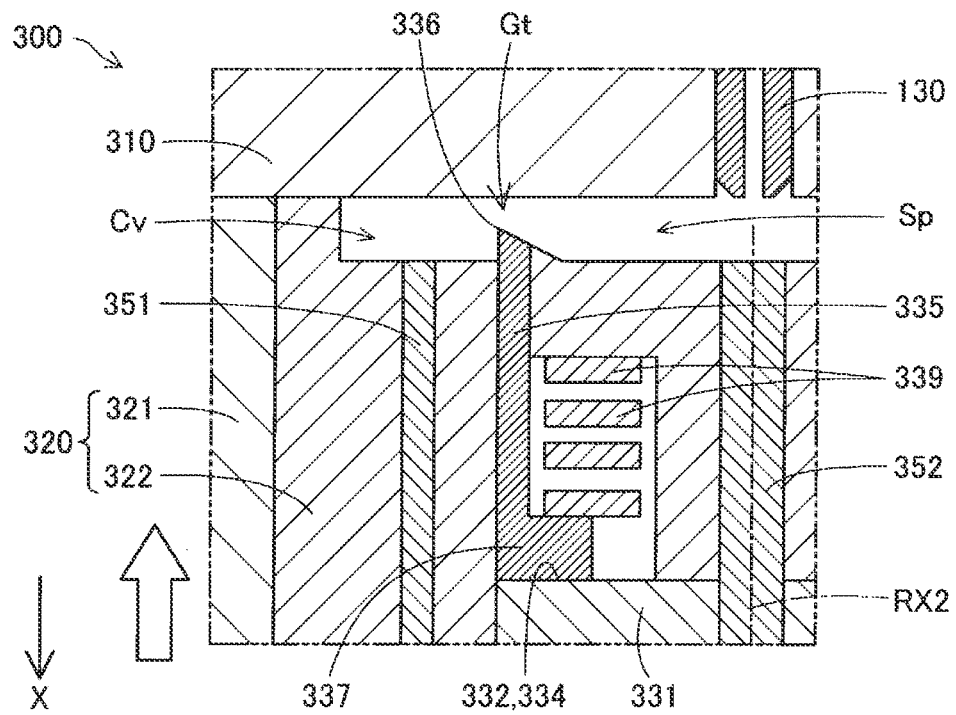
FIG. 9 is a first illustrative diagram illustrating a manner of injection molding according to the first embodiment.

As illustrated in FIG. 8, in a mold clamping step of step S110, by controlling the mold drive unit 250, the control unit 500 brings the movable mold 320 into contact with the fixed mold 310 and sets the mold 300 in a mold clamping state. As illustrated in FIG. 9, the movable mold 320 comes into contact with the fixed mold 310, so that the runner Rn and the cavity Cv are partitioned between the fixed mold 310 and the movable mold 320.

Figure 10:
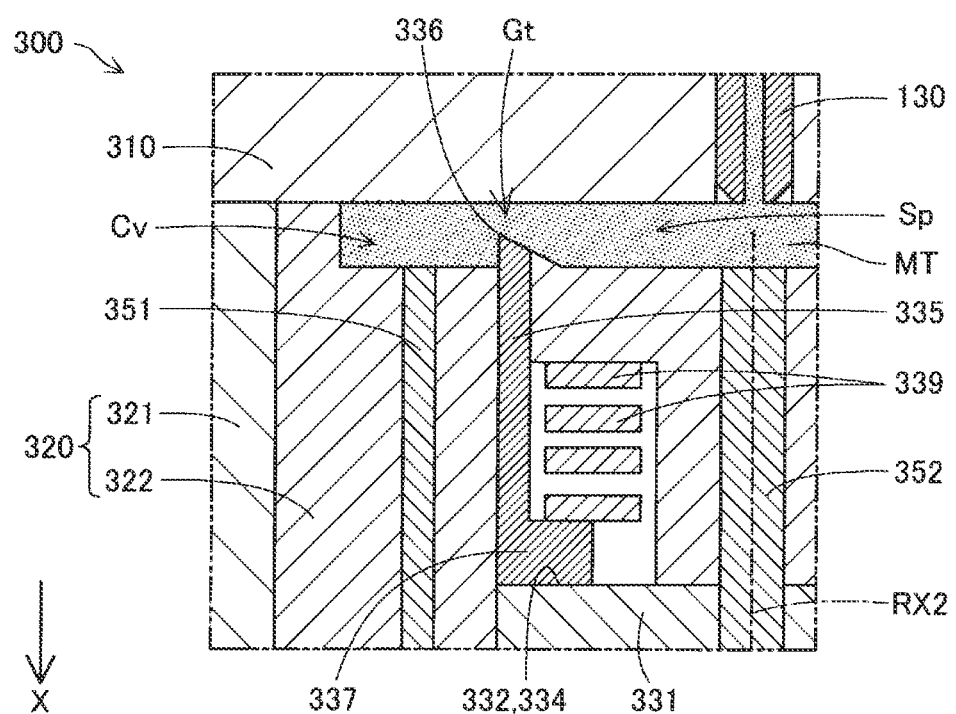
FIG. 10 is a second illustrative diagram illustrating the manner of the injection molding according to the first embodiment.

In an injection step of step S120, the control unit 500 plasticizes a molding material MT supplied from the hopper 101 by controlling the plasticizing unit 110, and injects the plasticized molding material MT from the nozzle 130 to the mold 300 by controlling the injection control mechanism 120. As illustrated in FIG. 10, in the injection step, the rear end portion 337 of the cutter 335 is in contact with the concave portion 334 of the rotary table 331, and the tip portion 336 of the cutter 335 is accommodated in the through hole of the telescoping portion 322. Therefore, the cavity Cv communicates with the runner Rn. The molding material MT injected from the nozzle 130 flows into the cavity Cv through the gate Gt which is the end portion of the runner Rn.

In a cooling step of step S130, the control unit 500 waits for a predetermined time until the molding material MT in the cavity Cv and the runner Rn cools and hardens. The molding material MT in the cavity Cv and the runner Rn is cooled by the refrigerant supplied from the refrigerant supply unit 400 to the mold 300.

Figure 11:
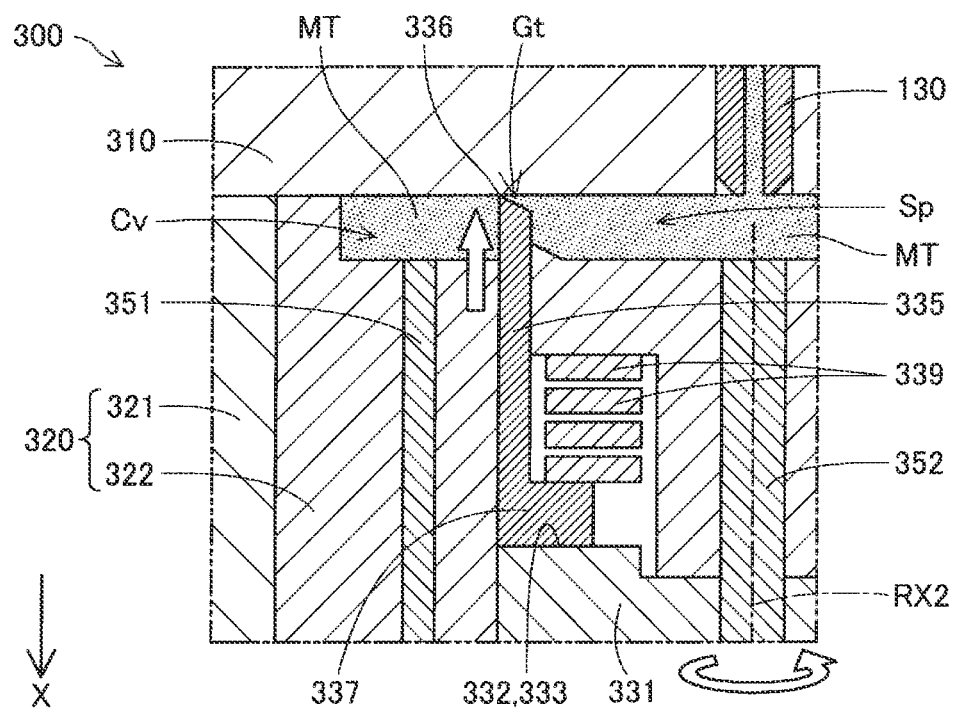
FIG. 11 is a third illustrative diagram illustrating the manner of the injection molding according to the first embodiment.
Figure 12:
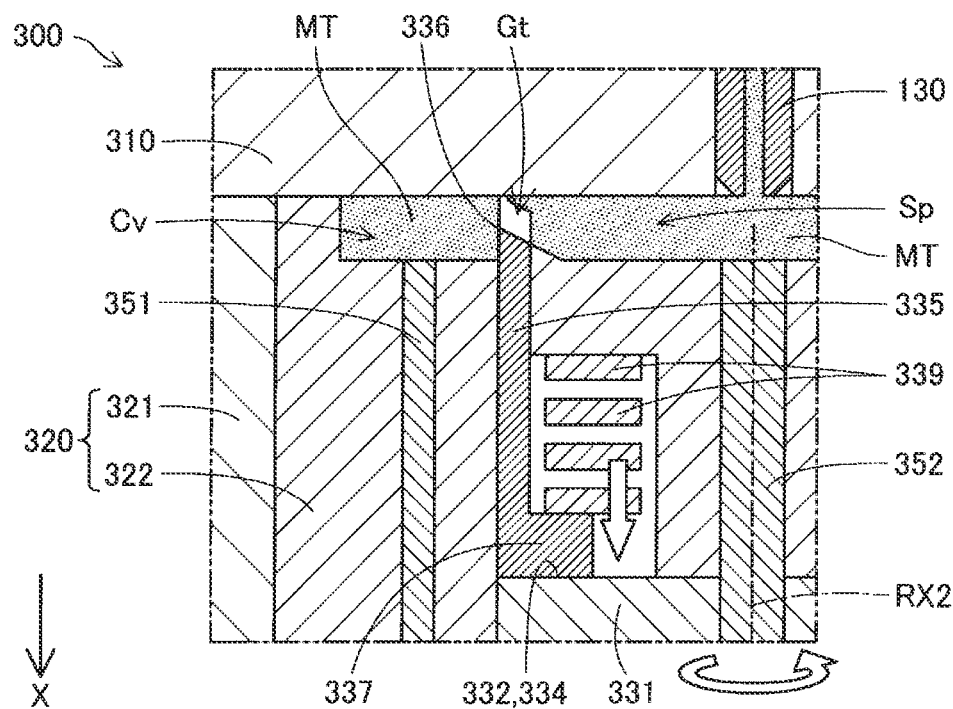
FIG. 12 is a fourth illustrative diagram illustrating the manner of the injection molding according to the first embodiment.

In a cutting step of step S140, the control unit 500 cuts the molding material MT hardened in the gate Gt using the tip portion 336 of the cutter 335 by controlling the drive unit 340. Specifically, the control unit 500 controls the drive unit 340 to rotate the rotary table 331. As illustrated in FIG. 11, the rotary table 331 rotates by 22.5 degrees, whereby the convex portion 333 is in contact with the rear end portion 337 of the cutter 335. Since the cutter 335 is pushed out in the −X direction by the convex portion 333, the tip portion 336 of the cutter 335 projects into the gate Gt and is pressed against the hardened molding material MT in the gate Gt. The molding material MT is cut by the tip portion 336 of the cutter 335 being pressed. As illustrated in FIG. 12, the rotary table 331 further rotates by 22.5 degrees, whereby the convex portion 333 separates from the cutter 335. Since the cutter 335 is pushed back in the +X direction by the first elastic member 339, the rear end portion 337 of the cutter 335 is in contact with the concave portion 334, and the tip portion 336 of the cutter 335 moves away from the molding material MT. In the present embodiment, the control unit 500 repeatedly presses the tip portion 336 of the cutter 335 against the molding material MT by rotating the rotary table 331 by 360 degrees or more to cut the molding material MT. In other embodiments, the control unit 500 may press the tip portion 336 of the cutter 335 once against the molding material MT by rotating the rotary table 331 by 45 degrees to cut the molding material MT.

Figure 13:
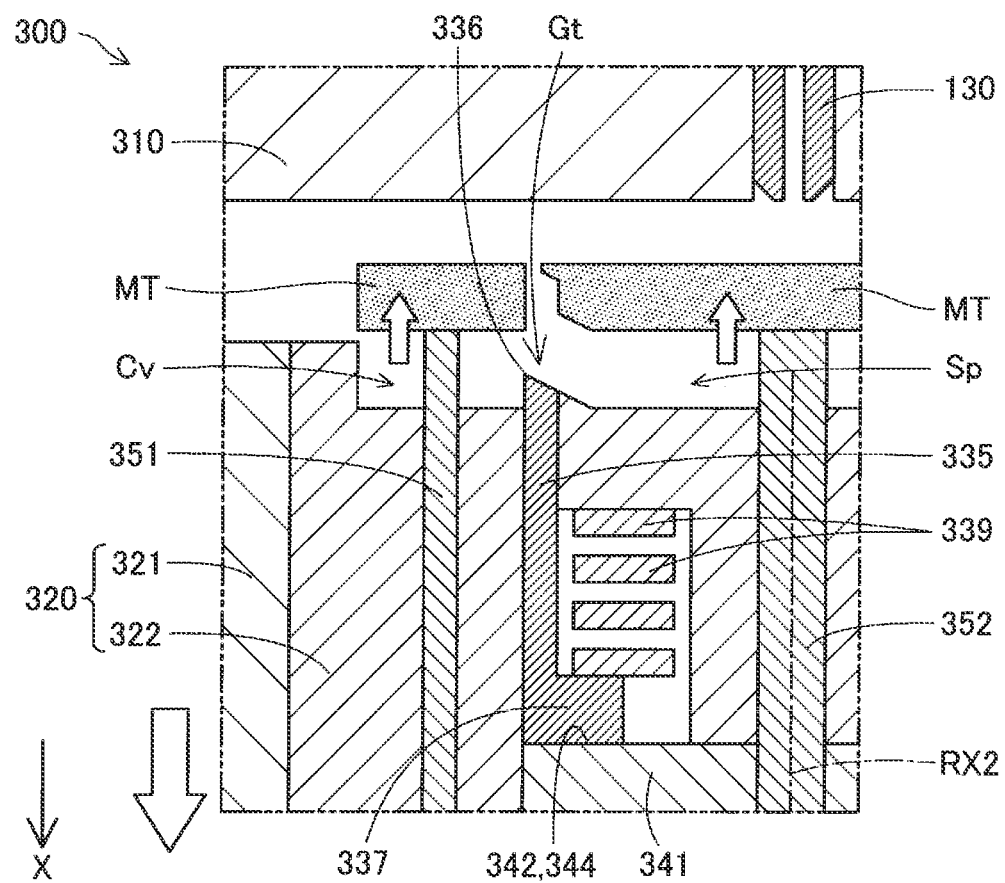
FIG. 13 is a fifth illustrative diagram illustrating the manner of the injection molding according to the first embodiment.

As illustrated in FIG. 13, in a mold opening step of step S150, by controlling the mold drive unit 250, the control unit 500 separates the movable mold 320 from the fixed mold 310 and sets the mold 300 in a mold opening state.

In an extruding step of step S160, the control unit 500 extrudes and demolds the molding material MT hardened in the cavity Cv, in other words, the molded article, and extrudes and demolds the molding material MT hardened in the runner Rn. As illustrated in FIG. 13, in the present embodiment, the first ejector pin 351 projects into the cavity Cv as the movable mold 320 moves, and the second ejector pin 352 projects into a sprue Sp as the movable mold 320 moves. The molding material MT hardened in the cavity Cv is extruded by the tip portion of the first ejector pin 351. The molding material MT hardened in the sprue Sp is extruded by the tip portion of the second ejector pin 352. That is, in the present embodiment, the mold opening step of step S150 and the extruding step of step S160 are performed in parallel at the same time. Thereafter, the control unit 500 ends the process. The extruded molded article is taken out from the mold 300 by, for example, a robot arm and is placed on a transfer pallet.

According to the injection molding apparatus 10 in the present embodiment described above, after the molding material MT injected into the mold 300 from the nozzle 130 cools and hardens, the control unit 500 cuts the molding material MT in the gate Gt by controlling the drive unit 340 and projecting the tip portion 336 of the cutter 335 of the cutting mechanism 330 into the gate Gt. Therefore, the molding material MT can be cut at a desired position of the gate Gt.

In the present embodiment, since the control unit 500 causes the tip portion 336 of the cutter 335 to project into the gate Gt before opening the mold 300, the control unit 500 can cut the molding material MT by the tip portion 336 of the cutter 335 while supporting the molding material MT by the fixed mold 310. Therefore, it is possible to prevent the molding material from being pushed by the tip portion 336 of the cutter 335 and moving, and to cut the molding material MT more reliably.

In the present embodiment, it is possible to cause the tip portion 336 of the cutter 335 to project into the gate Gt by the rotation of the rotary table 331. Therefore, the molding material MT can be cut with a simple configuration.

In the present embodiment, since the cutting mechanism 330 is provided with the first elastic member 339 that urges the cutter 335 toward the uneven surface 332 of the rotary table 331, the tip portion 336 of the cutter 335 projecting into the gate Gt can be returned to an original position of the tip portion 336 by the first elastic member 339. In addition, since the cutter 335 can be reciprocated to press the tip portion 336 of the cutter 335 against the molding material MT multiple times, the molding material MT can be cut more reliably.

In the present embodiment, the injection unit 100 injects an elastomer as the molding material MT into the mold 300. The elastomer is stretchable. Therefore, for example, in an aspect of cutting the elastomer by a tunnel gate structure, the elastomer may stretch without being cut, and the elastomer may be torn off at a position different from the desired position. With respect to the above, in the present embodiment, since the tip portion 336 of the cutter 335 can be pressed against the elastomer, the elastomer can be cut at the desired position. Further, in the present embodiment, the cutter 335 can be reciprocated by the rotation of the rotary table 331, and thus the elastomer can be cut more reliably.

In the present embodiment, the drive unit 340 and the movable mold 320 are arranged side by side in a direction perpendicular to the moving direction of the movable mold 320. Therefore, the mold 300 can be miniaturized in the moving direction of the movable mold 320.

In the present embodiment, the mold 300 is provided with the first ejector pin 351 that projects into the cavity Cv according to the movement of the movable mold 320. Therefore, the molding material MT hardened in the cavity Cv can be easily demolded by the first ejector pin 351. Further, in the present embodiment, the mold 300 is provided with the second ejector pin 352 that projects into the runner Rn according to the movement of the movable mold 320. Therefore, the molding material MT hardened in the runner Rn can be easily demolded by the second ejector pin 352.

B. Second Embodiment

Figure 14:
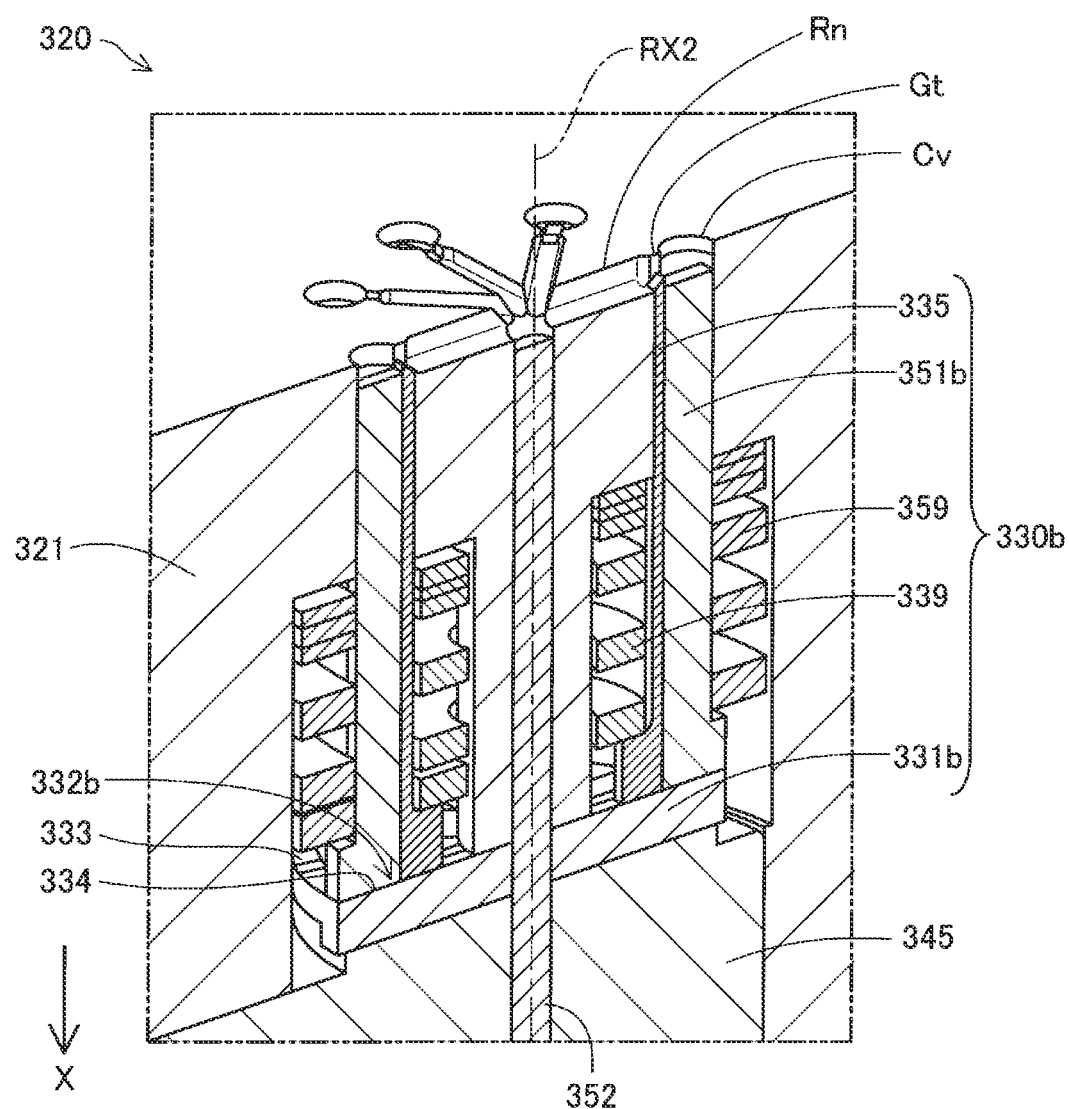
FIG. 14 is a perspective view illustrating a schematic configuration of a cutting mechanism according to a second embodiment.

FIG. 14 is a perspective view illustrating a schematic configuration of a cutting mechanism 330b provided in a mold 300b of an injection molding apparatus 10b according to a second embodiment. The injection molding apparatus 10b according to the second embodiment is different from that according to the first embodiment in that a first ejector pin 351b that causes the molded article to project is provided at the cutting mechanism 330b. Other configurations of the injection molding apparatus 10b are the same as those of the injection molding apparatus 10 according to the first embodiment shown in FIG. 1 unless otherwise specified.

In the present embodiment, the cutting mechanism 330b includes a rotary table 331b, the cutters 335, the first ejector pin 351b, the first elastic member 339, and a second elastic member 359. On an uneven surface 332b of the rotary table 331b, the convex portion 333 and the concave portion 334 are formed on a circle centered on the central axis RX2 and overlapping the cutter 335 when viewed in the +X direction, and the convex portion 333 and the concave portion 334 are formed on a circle centered on the central axis RX2 and overlapping the first ejector pin 351b when viewed in the +X direction.

In the present embodiment, the cutters 335 and the first ejector pin 351b are arranged side by side in a radial direction of the rotary table 331b. The first ejector pin 351b is provided in the +X direction with respect to the cavity Cv. The first ejector pin 351b is urged toward the uneven surface 332b of the rotary table 331b by the second elastic member 359. In the present embodiment, the second elastic member 359 is implemented by a compression coil spring. The second elastic member 359 may be implemented by a rubber or an elastomer.

When the rotary table 331b rotates by a predetermined angle from a state in which the rear end portion of the cutter 335 is in contact with the concave portion 334 and a rear end portion of the first ejector pin 351b is in contact with the concave portion 334, the rear end portion of the cutter 335 is pushed by the convex portion 333 of the uneven surface 332b, and the tip portion of the cutter 335 projects into the gate Gt. At this time, the rear end portion of the first ejector pin 351b is in contact with the concave portion 334 of the uneven surface 332b.

When the rotary table 331b further rotates by the predetermined angle from a state in which the tip portion of the cutter 335 projects into the gate Gt, the rear end portion of the first ejector pin 351b is pushed by the convex portion 333, and a tip portion of the first ejector pin 351b projects into the cavity Cv. At this time, the rear end portion of the cutter 335 is in contact with the convex portion 333, and the tip portion of the cutter 335 projects into the gate Gt. In other embodiments, the uneven surface 332b may be formed such that the rear end portion of the cutter 335 is in contact with the concave portion 334 when the convex portion 333 is in contact with the rear end portion of the first ejector pin 351b.

When the rotary table 331b further rotates by the predetermined angle from a state in which the tip portion of the first ejector pin 351b projects into the cavity Cv, the cutter 335 is pushed back to the first elastic member 339 and comes into contact with the concave portion 334, and the first ejector pin 351b is pushed back to the second elastic member 359 and comes into contact with the concave portion 334.

According to the injection molding apparatus 10b in the present embodiment described above, since the tip portion of the first ejector pin 351b can project into the cavity Cv by the rotation of the rotary table 331b, the molding material MT hardened in the cavity Cv can be easily demolded by the first ejector pin 351b.

C. Third Embodiment

Figure 15:
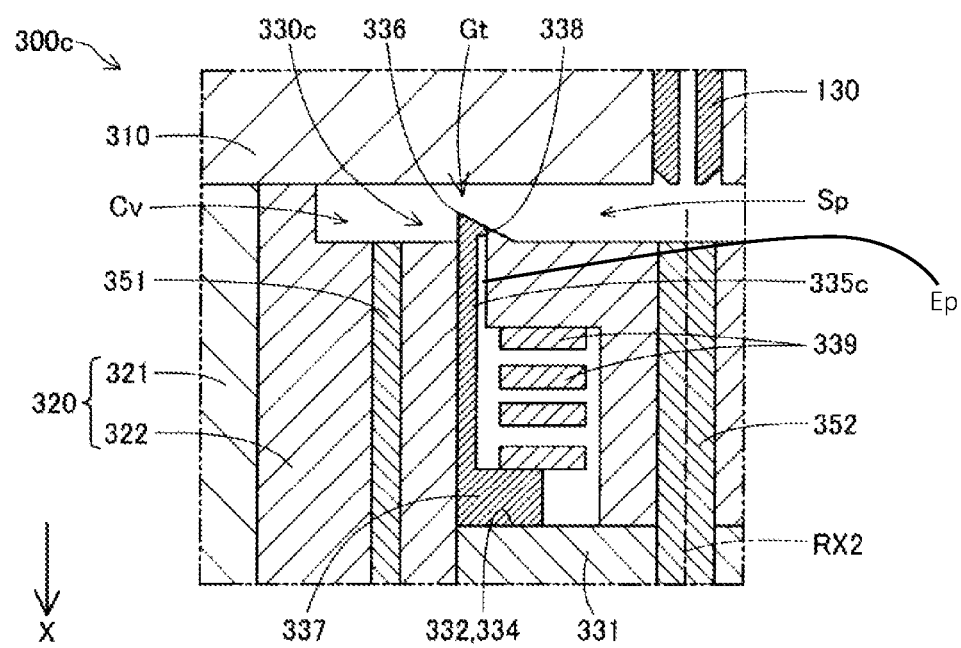
FIG. 15 is a first cross-sectional view illustrating a schematic configuration of a cutting mechanism according to a third embodiment.
Figure 16:
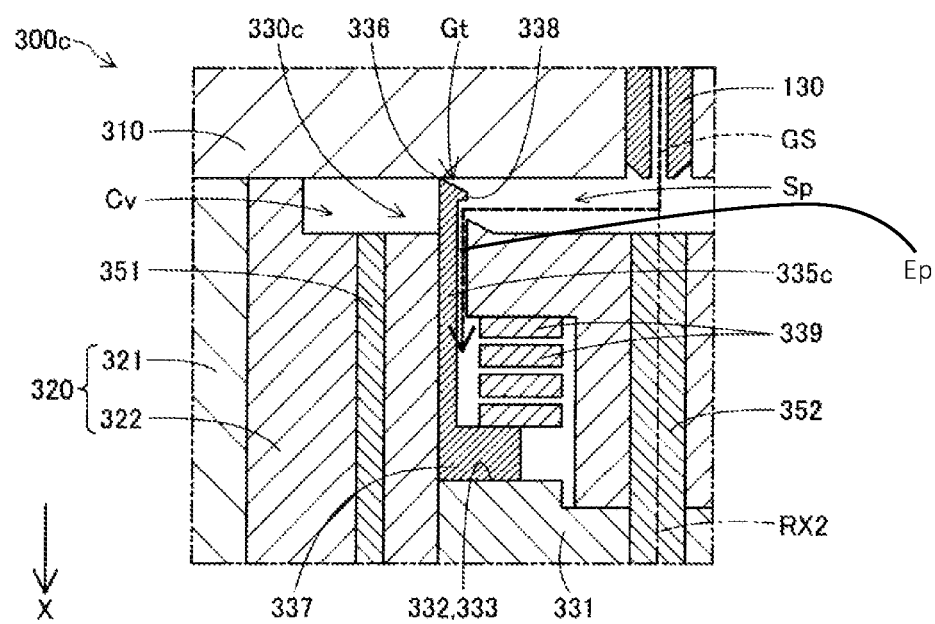
FIG. 16 is a second cross-sectional view illustrating the schematic configuration of the cutting mechanism according to the third embodiment.

FIGS. 15 and 16 are cross-sectional views illustrating a schematic configuration of a cutting mechanism 330c provided in a mold 300c of an injection molding apparatus 10c according to a third embodiment. The injection molding apparatus 10c according to the third embodiment is different from that according to the first embodiment in that a tip portion 336 of a cutter 335c is provided with a valve portion 338. Other configurations of the injection molding apparatus 10c are the same as those of the injection molding apparatus 10 according to the first embodiment shown in FIG. 1 unless otherwise specified.

As illustrated in FIG. 15, in the present embodiment, the movable mold 320 is formed with an exhaust passage Ep for communicating with the runner Rn between the cutter 335c and the telescoping portion 322. A tip portion 336 of the cutter 335c is formed in a hook shape and includes the valve portion 338. The valve portion 338 blocks an inflow of a gas from the runner Rn into the exhaust passage Ep by coming into contact with the telescoping portion 322. As illustrated in FIG. 16, the valve portion 338 introduces the gas from the runner Rn into the exhaust passage Ep by moving away from the telescoping portion 322. The valve portion 338 opens and closes according to the rotation of the rotary table 331. Specifically, when the cutter 335c is in contact with the concave portion 334, the exhaust passage Ep is blocked by the valve portion 338, and when the cutter 335c is in contact with the convex portion 333, the exhaust passage Ep is opened by the valve portion 338.

Since a gas GS is generated from the molding material when the molding material is plasticized in the plasticizing unit 110, in the injection step, the gas GS flows into the mold 300c from the nozzle 130 prior to the injection of the molding material from the nozzle 130. When the gas GS accumulates in the cavity Cv, the gas GS may become a cause of poor molding. Therefore, in the present embodiment, in the injection step, the control unit 500 opens the valve portion 338 and discharges the gas GS flowing from the nozzle 130 to the exhaust passage Ep. Thereafter, the control unit 500 closes the valve portion 338 before the molding material flows into the valve portion 338.

According to the injection molding apparatus 10c in the present embodiment described above, the control unit 500 discharges the gas GS in the mold 300c by opening the valve portion 338. Therefore, it is possible to prevent the occurrence of the poor molding due to the accumulation of the gas GS in the cavity Cv.

D. Other Embodiments (D1) In the injection molding apparatuses 10 to 10c according to the embodiments described above, the control unit 500 cuts the molding material MT by causing the tip portions 336 of the cutters 335 and 335c to project into the gate Gt prior to the mold opening step. On the other hand, the control unit 500 may cut the molding material MT by causing the tip portions 336 of the cutters 335 and 335c to project into the gate Gt after the mold opening step.

(D2) In the injection molding apparatuses 10 to 10c according to the embodiments described above, the cutting mechanisms 330 to 330c cause the cutters 335 and 335c to linearly move along the central axis RX2 and project into the gate Gt by the rotation of the rotary tables 331 and 331b around the central axis RX2. On the other hand, the cutting mechanisms 330 to 330c may cause the cutters 335 and 335c to move linearly along the central axis RX2 by causing the rotary tables 331 and 331b to linearly move along the central axis RX2 without rotating the rotary tables 331 and 331b.

(D3) In the injection molding apparatus 10 according to the first embodiment described above, the cutting mechanism 330 is provided with the first elastic member 339 that urges the cutter 335 toward the rotary table 331. On the other hand, the first elastic member 339 that urges the cutter 335 toward the rotary table 331 may not be provided. In such a case, for example, a user may manually return the cutter 335 to an original position thereof after the molded article is taken out and before a next injection molding process is performed.

(D4) In the injection molding apparatus 10b according to the second embodiment described above, the cutting mechanism 330b is provided with the first elastic member 339 that urges the cutter 335 toward the rotary table 331b, and the second elastic member 359 that urges the first ejector pin 351b toward the rotary table 331b. On the other hand, at least one of the first elastic member 339 and the second elastic member 359 may not be provided at the injection molding apparatus 10b. In such a case, for example, the user may manually return the cutter 335 or the first ejector pin 351b to the original position thereof after the molded article is taken out and before the next injection molding process is performed.

(D5) In the injection molding apparatuses 10 to 10c according to the embodiments described above, the drive unit 340 and the movable mold 320 are arranged side by side in the Z direction, which is a direction perpendicular to the X direction serving as the moving direction of the movable mold 320. On the other hand, the drive unit 340 and the movable mold 320 may be arranged side by side in the Y direction. The drive unit 340 and the movable mold 320 may be arranged side by side in the moving direction of the movable mold 320. For example, the drive unit 340 may be arranged in the +X direction with respect to the movable mold 320.

(D6) In the injection molding apparatuses 10 to 10c according to the embodiments described above, the cutting mechanisms 330 to 330c are provided in the movable mold 320. On the other hand, the cutting mechanisms 330 to 330c may be provided in the fixed mold 310.

(D7) In the injection molding apparatuses 10 to 10c according to the embodiments described above, the cutting mechanisms 330 to 330c are formed such that the cutters 335 and 335c project into the gate Gt. On the other hand, the cutting mechanisms 330 to 330c may be formed such that the cutters 335 and 335c project into a part of the runner Rn other than the gate Gt.

(D8) In the injection molding apparatuses 10 to 10c according to the embodiments described above, the injection unit 100 injects the thermoplastic resin or the thermoplastic elastomer as the molding material into the cavity Cv. On the other hand, the injection unit 100 may inject, for example, a thermosetting resin or a thermosetting elastomer as the molding material into the cavity Cv. In such a case, in the injection molding apparatuses 10 to 10c, the injection unit 100 injects a molding material that is fluidizable by being preheated by the plasticizing unit 110 into the cavity Cv, and the molds 300 to 300c are provided with a heater that heats and hardens the molding material injected into the cavity Cv.

E. Other Aspects

The present disclosure is not limited to the embodiments described above, and can be implemented in various aspects without departing from the scope of the present disclosure. For example, the present disclosure can be implemented in the following aspects. In order to solve a part of or all of problems according to the present disclosure, or to achieve a part of or all of effects according to the present disclosure, technical features of the above-described embodiments corresponding to technical features in the following aspects can be replaced or combined appropriately. Unless described as essential in the present description, the technical features can be deleted appropriately.

(1) According to a first aspect of the present disclosure, an injection mold apparatus is provided. The injection molding apparatus includes: a mold that includes a fixed mold and a movable mold facing the fixed mold, and that is formed with a cavity partitioned by the fixed mold and the movable mold and a runner communicating with the cavity; a mold clamping unit configured to move the movable mold with respect to the fixed mold; an injection unit configured to inject a molding material into the cavity through the runner; a cutting mechanism that is provided at the mold and that includes a cutter projecting to the runner; a drive unit that is provided on the mold and that is configured to drive the cutting mechanism; and a control unit configured to control the injection unit, the mold clamping unit, and the drive unit. The control unit controls the injection unit to inject the molding material into the cavity, and then controls the drive unit to cause the cutter to project to the runner, thereby cutting the molding material hardened in the runner.

According to the injection molding apparatus in this aspect, since the hardened molding material is cut by causing the cutter to project to the runner, the molding material can be cut at the desired position.

(2) In the injection molding apparatus according to the above aspect, the control unit may control the injection unit to inject the molding material into the cavity, and then cut, before controlling the mold clamping unit to open the mold, the molding material hardened in the runner.

According to the injection molding apparatus in this aspect, since the cutter projects to the runner before the mold opening, it is possible to prevent the molding material from being pushed by the cutter and moving without being cut. Therefore, the molding material can be cut more reliably.

(3) In the injection molding apparatus according to the above aspect, the cutting mechanism may include a rotary table having an uneven surface on which convex portions and concave portions are alternately arranged along a circumferential direction centered on a rotational axis, and the cutter provided on the uneven surface, the rotary table may rotate around the rotational axis by the drive unit so as to push the cutter by the convex portions, and the cutter may be pushed by the convex portions and linearly move along the rotational axis so as to project to the runner.

According to the injection molding apparatus in the above aspect, it is possible to cause the cutter to project to the runner by the rotation of the rotary table. Therefore, the molding material can be cut with a simple configuration.

(4) In the injection molding apparatus according to the above aspect, the mold may include an elastic member that urges the cutter toward the uneven surface.

According to the injection molding apparatus in this aspect, it is possible to return the cutter projecting to the runner to the original position by the elastic member.

(5) In the injection molding apparatus according to the above aspect, the mold may have an exhaust passage that communicates with the runner and through which a gas in the mold is discharged, and a valve portion that opens and closes the exhaust passage may be provided at a tip portion of the cutter.

According to the injection molding apparatus in this aspect, by opening the valve portion, the gas flowing into the mold from the injection unit can be discharged prior to the injection of the molding material from the injection unit. Therefore, it is possible to prevent the poor molding due to the accumulation of the gas in the mold.

(6) In the injection molding apparatus according to the above aspect, the mold may include an ejector pin provided on the uneven surface, the rotary table may rotate around the rotational axis by the drive unit so as to push the ejector pin by the convex portions, and the ejector pin may be pushed by the convex portions and linearly move along the rotational axis so as to project to the cavity.

According to the injection molding apparatus in this aspect, it is possible to drive the ejector pin by the rotation of the rotary table and extrude the molding material hardened in the cavity.

(7) In the injection molding apparatus according to the above aspect, the mold may include an ejector pin that linearly moves according to a movement of the movable mold caused by the mold clamping unit so as to project to the cavity.

According to the injection molding apparatus in this aspect, it is possible to drive the ejector pin by the movement of the movable mold and extrude the molding material hardened in the cavity.

(8) In the injection molding apparatus according to the above aspect, the drive unit may be provided in a direction perpendicular to a moving direction of the movable mold with respect to the movable mold.

According to the injection molding apparatus in this aspect, the mold can be miniaturized in the moving direction of the movable mold as compared with the aspect in which the mold and the drive unit are arranged side by side in the moving direction of the movable mold.

(9) In the injection molding apparatus according to the above aspect, the injection unit may inject an elastomer as the molding material.

According to the injection molding apparatus in this aspect, it is possible to cut the elastomer, which is easily torn off by a tunnel gate type mold, with the cutter.

(10) According to a second aspect of the present disclosure, a mold of an injection molding apparatus is provided. The mold of an injection molding apparatus includes: a fixed mold; a movable mold that faces the fixed mold and that moves with respect to the fixed mold; a cutting mechanism that includes a cutter; and a drive unit configured to drive the cutting mechanism. The fixed mold and the movable mold partition a cavity to be filled with a molding material, at least one of the fixed mold and the movable mold is formed with a runner communicating with the cavity, and the cutting mechanism is driven by the drive unit to cause the cutter to project to the runner after the molding material is injected into the cavity through the runner, thereby cutting the molding material hardened in the runner.

According to the mold of the injection molding apparatus in this aspect, since the hardened molding material is cut by causing the cutter to project to the runner, the molding material can be cut at the desired position.

The present disclosure can be implemented in various aspects other than the injection molding apparatus. For example, the present disclosure can be implemented in the form of a mold of an injection molding apparatus, a gate cutting apparatus, a gate cutting method, or the like.

What is claimed is:

1. An injection molding apparatus comprising:
   a mold that includes a fixed mold and a movable mold facing the fixed mold, and that is formed with a cavity defined by the fixed mold and the movable mold and a runner communicating with the cavity;
   a mold clamping unit configured to move the movable mold with respect to the fixed mold;
   an injection unit configured to inject a molding material into the cavity through the runner;
   a cutting mechanism that is provided at the mold and that includes a cutter projecting to the runner;
   a drive unit that is provided on the mold and that is configured to drive the cutting mechanism; and
   a control unit configured to control the injection unit, the mold clamping unit, and the drive unit, wherein
   the control unit controls the injection unit to inject the molding material into the cavity, and then controls the drive unit to cause the cutter to project to the runner, thereby cutting the molding material hardened in the runner,
   the cutting mechanism includes a rotary table having an uneven surface on which convex portions and concave portions are alternately arranged along a circumferential direction centered on a rotational axis, and the cutter is provided on the uneven surface,
   the rotary table rotates around the rotational axis by the drive unit so as to push the cutter by the convex portions, and
   the cutter is pushed by the convex portions and linearly moves along the rotational axis so as to project to the runner.

2. The injection molding apparatus according to claim 1, wherein
   the control unit controls the injection unit to inject the molding material into the cavity, and then cuts the molding material hardened in the runner before controlling the mold clamping unit to open the mold.

3. The injection molding apparatus according to claim 1, wherein
   the mold includes an elastic member that urges the cutter toward the uneven surface.

4. The injection molding apparatus according to claim 1, wherein
   the mold has an exhaust passage that communicates with the runner and through which a gas in the mold is discharged, and
   a valve portion that opens and closes the exhaust passage is provided at a tip portion of the cutter.

5. The injection molding apparatus according to claim 1, wherein
   the mold includes an ejector pin provided on the uneven surface,
   the rotary table rotates around the rotational axis by the drive unit so as to push the ejector pin by the convex portions, and
   the ejector pin is pushed by the convex portions and linearly moves along the rotational axis so as to project to the cavity.

6. The injection molding apparatus according to claim 1, wherein
   the mold includes an ejector pin that linearly moves according to a movement of the movable mold caused by the mold clamping unit so as to project to the cavity.

7. The injection molding apparatus according to claim 1, wherein
   the drive unit is provided in a direction perpendicular to a moving direction of the movable mold with respect to the movable mold.

8. The injection molding apparatus according to claim 1, wherein
   the injection unit injects an elastomer as the molding material.

9. A mold of an injection molding apparatus, the mold comprising:
   a fixed mold;
   a movable mold that faces the fixed mold and that moves with respect to the fixed mold;
   a cutting mechanism that includes a cutter; and
   a drive unit configured to drive the cutting mechanism, wherein
   the fixed mold and the movable mold define a cavity to be filled with a molding material,
   at least one of the fixed mold and the movable mold is formed with a runner communicating with the cavity,
   the cutting mechanism is driven by the drive unit to cause the cutter to project to the runner after the molding material is injected into the cavity through the runner, thereby cutting the molding material hardened in the runner,
   the cutting mechanism includes a rotary table having an uneven surface on which convex portions and concave portions are alternately arranged along a circumferential direction centered on a rotational axis, and the cutter is provided on the uneven surface,
   the rotary table rotates around the rotational axis by the drive unit so as to push the cutter by the convex portions, and
   the cutter is pushed by the convex portions and linearly moves along the rotational axis so as to project to the runner.

* * * * *